(12) United States Patent
Figlin et al.

(10) Patent No.: US 8,516,576 B2
(45) Date of Patent: Aug. 20, 2013

(54) NETWORK INTRUSION DETECTION WITH DISTRIBUTED CORRELATION

(75) Inventors: Igal Figlin, Tirat Carmel (IL); Arthur Zavalkovsky, Netanya (IL); Lior Arzi, Atlit (IL); Efim Hudis, Bellevue, WA (US); Jennifer R. LeMond, Kirkland, WA (US); Robert Eric Fitzgerald, Bellevue, WA (US); Khaja E. Ahmed, Bellevue, WA (US); Jeffrey S. Williams, Seattle, WA (US); Edward W. Hardy, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 730 days.

(21) Appl. No.: 12/686,959

(22) Filed: Jan. 13, 2010

(65) Prior Publication Data

US 2011/0173699 A1    Jul. 14, 2011

(51) Int. Cl.
  *H04L 29/06*        (2006.01)
(52) U.S. Cl.
  USPC .................................. 726/22; 726/23; 726/25
(58) Field of Classification Search
  USPC .............................................. 726/22, 23, 25
  See application file for complete search history.

(56) References Cited

U.S. PATENT DOCUMENTS

| | | | |
|---|---|---|---|
| 5,991,881 A * | 11/1999 | Conklin et al. | 726/22 |
| 6,839,850 B1 * | 1/2005 | Campbell et al. | 726/23 |
| 7,376,969 B1 * | 5/2008 | Njemanze et al. | 726/22 |
| 2003/0093692 A1 | 5/2003 | Porras | |
| 2004/0024864 A1 * | 2/2004 | Porras et al. | 709/224 |
| 2004/0044912 A1 * | 3/2004 | Connary et al. | 713/201 |
| 2004/0117658 A1 * | 6/2004 | Klaes | 713/201 |
| 2005/0132230 A1 | 6/2005 | Miclea | |
| 2006/0206940 A1 | 9/2006 | Strauss | |
| 2007/0107058 A1 | 5/2007 | Schuba | |
| 2008/0148398 A1 * | 6/2008 | Mezack et al. | 726/22 |

OTHER PUBLICATIONS

Chari et al., BlueBoX: A Policy-Driven, Host-Based Intrusion Detection System, 2003, http://reference.kfupm.edu.sa/content/b/l/bluebox_a_policy_driven_host_based_int_77729.pdf.

Garfinkel et al., A Virtual Machine Introspection Based Architecture for Intrusion Detection, Mar. 26, 2005, http://suif.stanford.edu/papers/vmi-ndss03.pdf.

Snapp et al. DIDS (Distributed Intrusion Detection System)—Motivation, Architecture, and an Early Prototype, 1997, http://seclab.cs.ecdavis.edu/papers/DIDS.nese91.pdf.

White et al., Cooperating Security Managers: A Peer-Based Intrusion Detection System, 1996, http://comsoc.org/ni/private/1996/jan/pdf/White.pdf.

* cited by examiner

*Primary Examiner* — Chau Le (57) ABSTRACT

A network security system employing multiple levels of processing to identify security threats. Multiple host machines may each contain an agent that detects possibilities of security threats based on raw data sensed locally at that host. The hosts may share information obtained from local analysis and each host may use information generated at one or more other hosts, in combination with information generated locally, to identify a security concern, indicating with greater certainty that a security threat exists. Based on security concerns generated by multiple hosts, a security threat may be indicated and protective action may be taken.

20 Claims, 7 Drawing Sheets

NETWORK INTRUSION DETECTION WITH DISTRIBUTED CORRELATION

BACKGROUND

Intrusion detection is the practice of identifying inappropriate, unauthorized, or malicious activity in computer systems. Systems designed for intrusion detection typically monitor for security breaches perpetrated by external attackers as well as by insiders using the computer system or a computer network. As computer systems become increasingly interconnected through networking, intruders and attackers are provided with greater opportunities for gaining unauthorized access while avoiding detection. As a result of widespread cooperative use of shared computing resources, for example in corporate network environments, intrusion detection systems (IDS) are commonly tasked with monitoring complex system organizations and detecting intrusions to network segments including multiple computing machines and/or devices.

Figure 1:
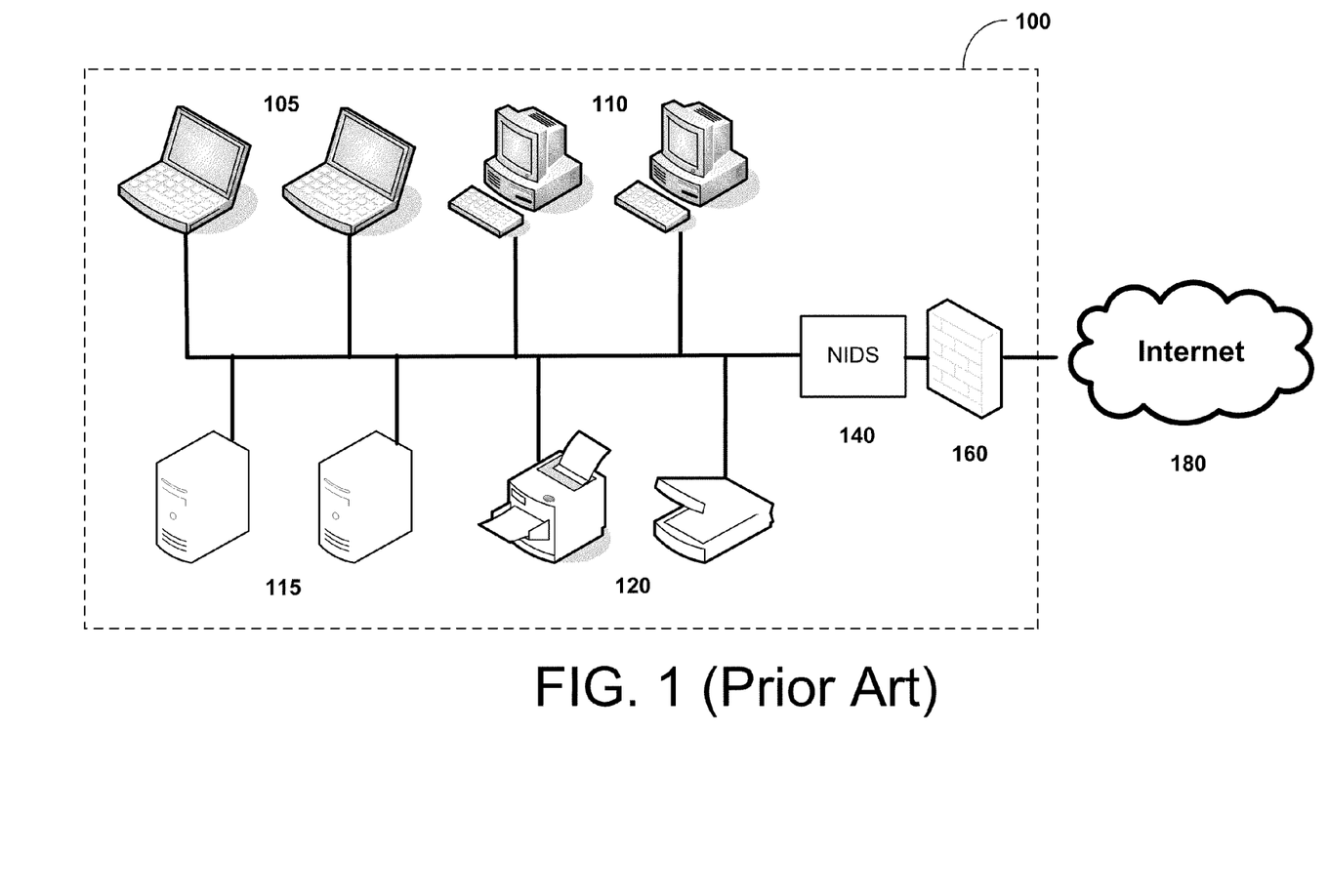
FIG. 1 is a block diagram illustrating a conventional network intrusion detection system implementation for a simple network segment.

FIG. 1 illustrates a simple computing network, for example in a business office, which includes multiple electronic machines and/or devices of various types, such as personal computers 105, office workstations 110, mass storage subsystems and servers 115, and printers/copiers/fax machines 120. The various devices are connected through a network to form an integrated environment in which information can be generated, accessed and shared among the legitimate users of the business environment. In such a network, a potential intruder can attempt to compromise any of a number of interconnected machines and/or devices in order to gain access to the network 100 as a whole.

In order to detect such attack attempts, some existing implementations of IDS install a host-based sensor at each of the machines within the network to be monitored. Such host-based intrusion detection system (HIDS) sensors are typically loaded in software onto a host system such as a computer to monitor the traffic (some of which may be encrypted) going in and out of the host. Anomalous traffic patterns or known attack signatures could signal an external attack on the host, an unauthorized use originating from the host, or an internal attack originating from an infected or otherwise compromised host. Some HIDS sensors may also monitor files and processes internal to the host system to watch for suspicious use of the host itself. If known suspicious activity is detected at the host, some HIDS will typically generate an alert to be sent throughout the network as a notification of a detected intrusion.

Other existing forms of IDS focus monitoring on an entire network segment rather than on individual hosts. Such network-based intrusion detection systems (NIDS) are typically installed as physical devices positioned at locations within the network where they can monitor all network traffic entering and exiting the network segment. For example, a NIDS sensor is often implemented as a physical NIDS device 140 placed just behind a firewall 160 protecting a network segment 100, as illustrated in FIG. 1, such that all traffic going in and out of the network segment must pass through and be scanned by the NIDS. The NIDS typically operates at the lower layers of the protocol stack to watch for suspicious network traffic patterns such as connection attempts to known frequently attacked ports, anomalous combinations in packet headers, and known attack signature patterns in unencrypted packets.

In addition to intrusion detection, some network security systems also incorporate intrusion protection systems (IPS) which are capable of reacting to detected security breaches to protect the network. For example, a network-based IPS could drop suspicious unencrypted packets or block a suspected intruder from communicating with the network. A host-based IPS could prevent unauthorized changes to files or code residing on the host system, and could deny access to the host by suspicious users or applications.

SUMMARY

Network intrusion detection may be achieved through multi-level distributed processing of network traffic. Distributed correlation may be used to relate events at different hosts to detect an intrusion.

In a first level, network traffic for individual hosts may be processed to detect suspicious network traffic and/or network interaction behavior. This processing may include correlating network traffic received at a host to known patterns of network traffic that are indicative of any of one or more types of intrusion attempts. Such known patterns may be indicative of any of one or more types of intrusion attempts in isolation, or may indicate network traffic patterns that may potentially become indicative of any of one or more types of intrusion attempts when processed at another level in combination with network traffic data from other hosts. Results of the first level of processing may be indicated in an activity summary, which may be shared with other hosts in the network, for example as a security report with security data indicating when potentially suspicious network traffic is detected.

Security data may include information that allows the security data generated based on network traffic at multiple hosts to be correlated. Such information may include information about a nature of an intrusion attempt suspected and/or a source of network traffic associated with the intrusion attempt. Security data may include local network traffic data that has been summarized, for example through filtering, aggregating, or otherwise reducing in volume the raw network traffic data monitored locally at the host. Security data may also include data derived from the local context of a host; for example, local context data may include information related to hardware and/or software installed on the host, tasks being executed by the host at the time of the suspected intrusion attempt, recent potentially suspicious activity occurring previous to the suspected intrusion attempt, and/or any other potentially relevant local context data from the host.

The security data generated by a single host may indicate a low level of certainty about a possible network intrusion attempt. A low level of certainty may represent a possibility that an intrusion attempt is being made, but need not necessarily indicate complete certainty of an intrusion attempt. For example, in some embodiments security data may include information about local network interactions that may not be inherently suspicious in isolation, but may potentially arouse suspicion when correlated with network interactions at multiple hosts. Thus, security data generated by only a single host may not provide a reliable prediction of whether an intrusion attempt has in fact occurred until it has been viewed in the context of data from other hosts.

An intermediate level of certainty may be gained at another level by processing security data to correlate activity on one host with activity on other hosts. For example, an increased level of certainty about a possible intrusion attempt may result from correlation of similar or connected events at multiple hosts. An increased level of certainty may also result because observations of multiple hosts may be trusted more than observations of a single host, which could potentially be compromised by an attacker.

As a result of such intermediate-level processing, a security concern may be generated. A security concern may indicate a higher level of certainty than is associated with security data in an activity summary from a single host, or may indicate an intrusion attempt characterized by a pattern of network traffic detected through activity on multiple hosts. Security concerns may also be communicated through security reports and used in processing elsewhere in the system.

At a further level, security concerns based on network traffic at multiple hosts may be processed to indicate whether a network intrusion attempt is detected. The processing, for example, may be based on a threshold number, percentage or other weighted combination of hosts indicating a security concern about a same suspected intrusion, a suspicious sequence and/or pattern of events across multiple hosts, or other predefined criteria relating to security data from multiple hosts. For example, security concerns may be weighted based on a level of certainty associated with each security concern. Security concerns from different types of hosts may also be weighted differently; for example, a security concern from a trusted server may carry greater weight than a security concern from another type of host. Additional relevant data from various hosts may also be queried and processed, in response to and in addition to the security concerns from multiple hosts. An intrusion attempt detected from a combination of security concerns and/or other relevant data may then be indicated through any suitable executable action, such as a report to an administrator or automatically restricting network access for a host determined to be a source of the intrusion attempt.

Processing to detect an intrusion attempt may be performed in any suitable machine or machines, such as a computer or computers. In some embodiments, each host may perform processing on security reports received from other hosts. A host may generate security data based on its own network traffic in combination with security data in activity summaries and/or security concerns generated based on network traffic from other hosts. Likewise, each host may generate security concerns based on its own security data and/or network traffic in combination with security data in activity summaries and/or security concerns generated based on network traffic from other hosts. Though, in some embodiments, some of the processing may be performed in a centralized server or device. For example, a trusted server (e.g., a server considered more secure or otherwise more trustworthy than other hosts) may be designated to perform the ultimate detection of security threats based on combined activity summaries, security concerns and/or other relevant data from multiple hosts.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have recognized and appreciated that in many situations conventional intrusion detection systems are inadequately equipped to provide comprehensive monitoring in the face of ongoing evolution of computing and networking technologies. For example, as networked environments become increasingly larger and more complex, incorporating larger numbers and different types of interconnected devices, it becomes increasingly difficult for conventional IDS to effectively monitor all avenues for potential security breaches to the network.

In conventional host-based IDS, a sensor on a host machine can scan only the traffic received at and sent from that particular host. If the network segment to be monitored includes some unmanaged hosts, such as printers, network devices such as routers, or devices brought to the office from users' homes, on which sensors have not been installed, those machines are unmonitored and unprotected by a conventional HIDS. Even if a network includes only managed hosts, the combined efforts of the conventional HIDS sensors may not be able to collect enough information to detect a potential intrusion, especially in a large network environment.

Events that would be suspicious in combination with similar or connected events at other hosts in the network may not appear suspicious in isolation at an individual host. For example, in a network port scan attack, an intruder may attempt to make a connection to a specific Transmission Control Protocol (TCP) port (for example, a Structured Query Language (SQL) port) within the network by scanning multiple hosts for a listening port. If the number of hosts in the network is large, the intruder can make many access attempts on the network as a whole while only making a few attempts on each individual host. Lacking knowledge of the combined attempts on other hosts in the network, a conventional HIDS sensor may not detect sufficient suspicious activity based on the few failed connection attempts at its individual host to generate an intrusion alert.

Some existing HIDS implementations have a central device or agent to collect data from multiple host-based sensors in order to detect network-wide intrusion attempts such as port scans. In such implementations, each host-based sensor sends all of its raw threat monitoring data to the central device, rather than generating an alert by performing local analysis at the host to determine whether a threshold level of suspicion is crossed. The central device analyzes the raw data from all of the host sensors in the network to detect distributed attacks such as network scans. However, such implementations are often impractical, as sending raw data from multiple sensors to a central device can flood the network and overwhelm the central processing device or agent, reducing available bandwidth for other communications. Furthermore, if an intrusion has occurred and a host has become compromised, the host controlled by the intruder may send spurious or misleading data about its own system or about traffic from other machines to the analysis device, corrupting the intrusion detection process.

Applicants have recognized and appreciated that conventional network-based IDS also fall short of providing comprehensive security monitoring in increasingly complex network environments. For example, a physical NIDS device 140 placed just behind the main firewall 160 of a network segment sees only the unencrypted network traffic going through that device. In the configuration of FIG. 1, the NIDS device 140 can scan traffic going to and from the internet 180, but does not have access to traffic communicated between hosts internal to the network segment 100. Detection of unauthorized use of any host within the network could require physical deployment of NIDS sensors at each network connection to a host; this is often physically and commercially infeasible in large networks. Furthermore, physical NIDS devices can be costly to license, manage and maintain, and the cost of the system increases with the number of deployments needed.

Figure 2:
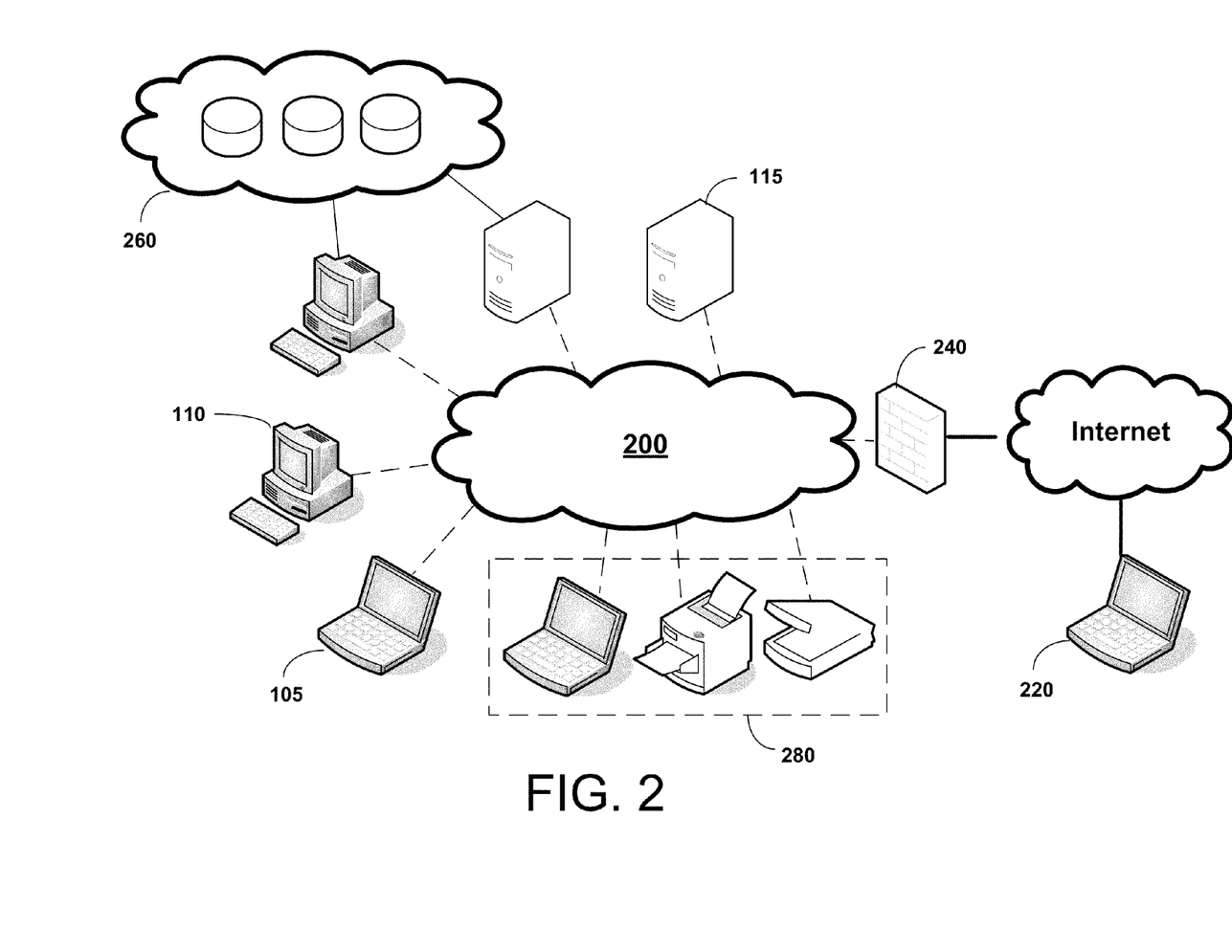
FIG. 2 is a block diagram illustrating an exemplary enterprise network environment in accordance with some embodiments of the present invention.

Increasingly, networking technology advances lead to enterprise network infrastructure that makes it impractical for NIDS devices to be placed at central access points through which all network traffic will flow. For example, FIG. 2 illustrates an enterprise network 200 in which multiple host machines (which may be any of various known types of electronic and/or computing machines) are interconnected through any of various combinations of wired technologies, wireless technologies, and the like. In networks supporting wireless communications, any device can potentially connect with any other device without sending traffic through a physical access point. Such connections render a physical NIDS device incapable of monitoring all network traffic within the enterprise environment.

Monitoring traffic from all hosts in the enterprise becomes increasingly important with the growth of mobile computing and pervasive encryption. Modern global enterprises may have users connecting to the network from hosts 220 at remote locations around the world through their own local internet service providers. These users may be allowed access to the enterprise network 200 through edge firewall 240. Increasingly, enterprise environments may include virtual networks connecting multiple remote hosts 220 scattered across the internet, for which monitoring of potentially innumerable network connections is not feasible. Some users may also bring in to the enterprise network 200 their personal computers, which can be considered unmanaged hosts 280 which possibly lack some security technologies installed on other hosts in the enterprise network. In addition, the advent of virtual machines 260 gives rise to traffic and interactions between different virtual machines within a single physical machine's operating system, which cannot be monitored by an external physical NIDS.

Another problem facing NIDS devices is encryption of network traffic, for example under protocols such as IPSec (Internet Protocol Security). Because conventional NIDS operate on network layers, they are unable to scan encrypted data packets, which are only decrypted at the destination host. Conventional NIDS also lack the ability to determine whether a detected intrusion attempt has succeeded; without access to local data at a host, conventional NIDS may not be able to detect whether the host has in fact been compromised. Solutions to these and other shortcomings of conventional IDS implementations are provided by Applicants' contributions of systems and methods for network intrusion detection with distributed correlation.

A network intrusion detection system with distributed correlation in accordance with some embodiments of the present invention may include multiple host agents, each installed on a host machine (hereafter "host") belonging to an enterprise network. Hosts may be any suitable computing machine or device. In the example of FIG. 1, hosts are illustrated as personal computer 105, office workstation 110, server 115, remote computer 220 connected to enterprise network 200 from a remote physical location through the internet, edge firewall 240, and virtual machines 260. In some embodiments, multiple virtual machines within a single physical operating system may each be installed with a host agent and therefore act as multiple hosts within the same computing device. For example, each virtual machine and the hardware that supports it may function as an individual host machine installed with a host agent, even if portions of the same hardware support one or more other virtual machines (i.e., one or more other hosts) within the same physical operating system. Each host may be connected to the enterprise network 200 via any of various wired and/or wireless connections.

Each host agent may have a sensing capacity (i.e., to generate data relevant to potentially suspicious activity in connection with the host) and an analysis capacity (i.e., to correlate data from multiple hosts to reach various determinations regarding the detection of a security threat to the network as a whole). The multiple hosts within the enterprise network may share and distribute, through their host agents, both sensing and analysis of data related to network security threats, obviating the need for a separate physical device to implement network intrusion detection. This distribution of sensing and analysis may be achieved through each host sharing with other hosts partially processed or summarized data relating to its own sensing and analysis of network threats. Each host may then make further analysis based on its sensing as well as on the sensing and analysis performed by other hosts.

Distribution of IDS sensing and analysis among existing hosts within the enterprise network can reduce the cost of providing security monitoring and protection to the network, through removing costs associated with installation and/or maintenance of a dedicated physical IDS device. Installation of a host agent on each managed host may be accomplished through less costly software and/or hardware implementations, and may also advantageously utilize the host's existing security technologies for data gathering purposes. Such existing security technologies may include, but are not limited to, anti-malware software, anti-virus software, heuristics/behavior monitoring, conventional HIDS sensors, firewalls, and the like. Host agents may also gather data from non-security-related technologies residing on the host system, such as network stacks or performance monitors.

Distributed sensing and analysis in accordance with some embodiments of the present invention can also allow distributed network-based security threats to be detected while maintaining the local context provided by each individual host. For example, each host agent installed on a host can monitor internal files and processes in addition to network traffic received at and sent from that host. If the network traffic is encrypted, for example under IPSec, the local host agent may scan the data when it is decrypted at the host. Network traffic may be monitored locally by each host agent, and security data including local context data may be shared among multiple host agents, allowing relevant local contextual information from individual hosts to be used in network-wide intrusion detection.

Sharing data among multiple host agents may allow distributed attacks such as network scans to be detected through combined sensing and analysis activities of multiple host agents. For example, although a few failed connection attempts at a single host may not be enough to indicate with certainty that a security threat is present, correlation of failed connection attempts at multiple hosts may increase the certainty with which the system can detect the security threat. As hosts detect such connection attempts, they may summarize the connection attempts in an activity summary and share such an activity summary with other hosts, for example in the form of a security report. A host receiving such activity summaries can generate further security reports, combining its analysis of sensed network activity with the analysis performed by other hosts and reflected in the received security reports.

The analysis capability of each host agent may allow local correlations to be performed at individual hosts, to minimize network traffic that would result from large amounts of raw data being sent to a central processing device. Host agents may monitor and analyze local raw data to identify potentially suspicious activity or to generate data that could be indicative of suspicious activity in combination with data from other hosts, and may send only summarized data, for example in the form of security reports, to other hosts in the enterprise network. The summarized data may have been filtered, aggregated, summarized, or otherwise reduced in volume from the local raw data monitored at the host. Host agents may also perform correlations of the data in security reports from other hosts with data from their own hosts, and may generate further security reports if the results of correlation increase the certainty with which a security threat is suspected. Local data at a host that may be correlated with data in security reports from other hosts may include, but are not limited to, information regarding local network traffic, ports available on the host, applications installed on the host, tasks currently being performed by the host, recent malware detections, and missing patches.

Intrusion detection based on combined analysis by multiple host agents also may prevent the detection process from becoming corrupted or subverted by misleading information from a compromised host. For example, some embodiments may require security reports from multiple host agents to identify a suspected source of a security threat before determining that the security threat is in fact detected. If security reports from multiple host agents identify a particular host as potentially compromised, security data sent from that host may be treated differently from security data from other hosts, or may be removed from consideration during the intrusion detection process. In addition, security data from different types of hosts may be treated with different degrees of trust; for example, security data from a trusted server may carry more weight than security data from other types of hosts.

In some embodiments, host agents may be installed on many different types of hosts within an enterprise network environment, including virtual machines and machines with wireless network connections. These host agents may be used to monitor network traffic and local data in locations at which deployment of conventional physical NIDS devices would be difficult. The distributed sensing and correlation of host agents on multiple varieties of hosts may enable detection of intrusion attempts focused on specific vulnerabilities of different types of connections between hosts, such as ease of accessibility in wireless networking, or operating system vulnerabilities offering inroads to the internal resources of virtual machines. Traffic to and from unmanaged hosts may also be included in the distributed correlations performed by multiple cooperating host agents.

Figure 3:
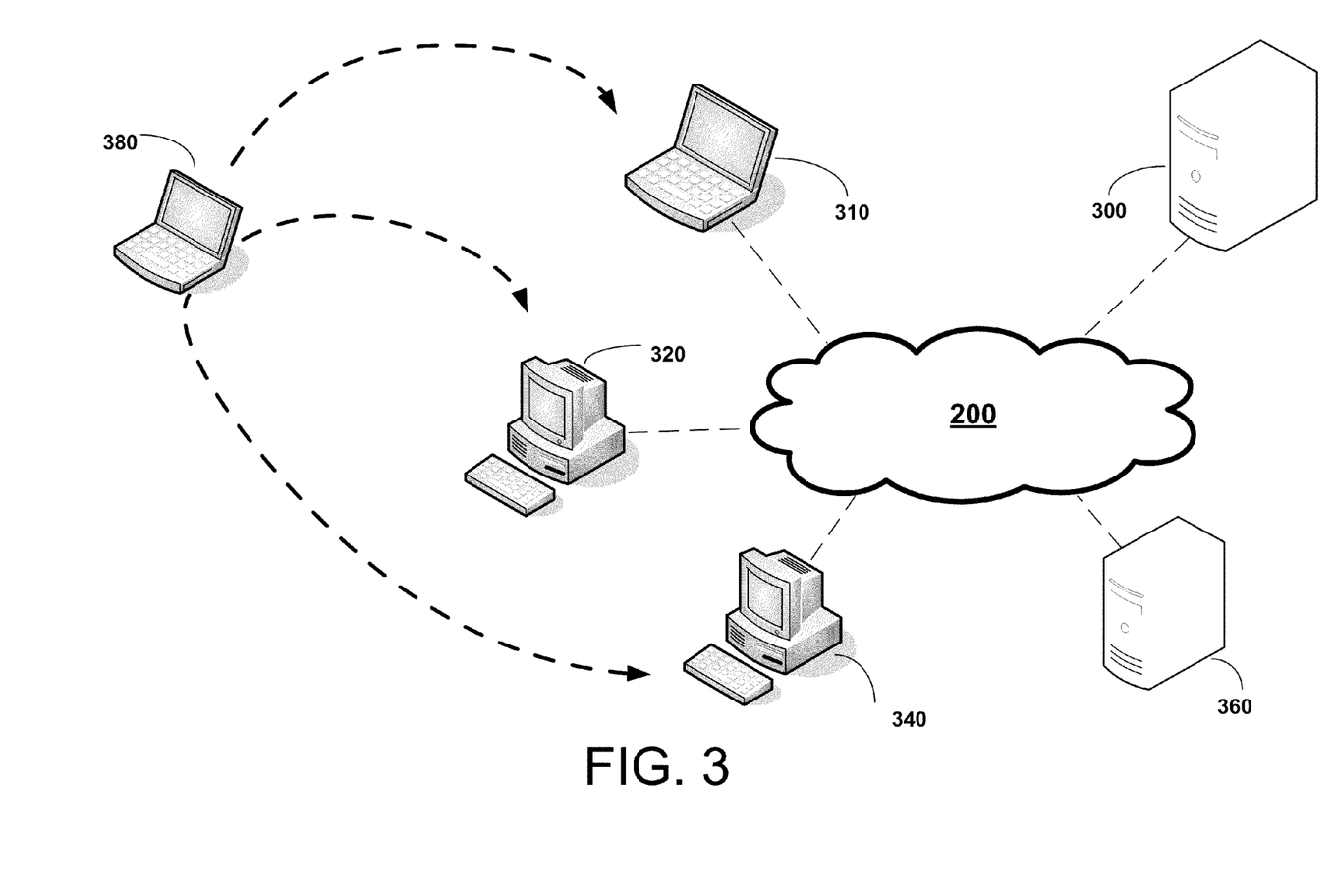
FIG. 3 is a block diagram illustrating operation of a network intrusion detection system with distributed correlation in accordance with some embodiments of the present invention.

FIG. 3 illustrates an exemplary scenario in an enterprise network in which a network intrusion detection system with distributed correlation may operate in accordance with some embodiments of the present disclosure. In general, an enterprise network may include any number of hosts of various types and constructions known in the art, such as computers, servers, network devices, and virtual machines. In a particular example, the enterprise network environment of FIG. 3 includes hosts 300, 310, 320, 340 and 360, which are connected to enterprise network 200 via any of various combinations of wired and/or wireless connections. Each host 300, 310, 320, 340 and 360 may be installed with an agent to perform network intrusion with distributed correlation in combination with agents installed on other hosts in the network environment. Also represented in FIG. 3 is an attacker 380 attempting to gain unauthorized access to enterprise network 200. For example, attacker 380 may perform a port scan, attempting to make a connection to an SQL port at each of hosts 310, 320 and 340.

Each of the host agents may be programmed to continuously monitor network traffic and/or interaction behavior at its corresponding host. Each host agent may periodically, or in response to detection of potentially suspicious activity, transmit local security data (e.g., in an activity summary in the form of a security report) to other hosts in the enterprise network. The security data may include summarized information about local network interactions that may be useful in correlation with data from other hosts to evaluate potential security threats to the network. Summarized information may be filtered, aggregated, or otherwise reduced in volume from the raw network traffic data local to the host. For example, host 310 may, in response to detecting a failed connection attempt from attacker 380, generate an activity summary including security data such as a source (e.g., the IP address of attacker 380) and/or a type (e.g., an attempted connection to an SQL port) of potentially suspicious network activity. The security report may also include relevant context data local to the host (e.g., information that host 310 is not in fact an SQL server). In isolation, the network activity identified by host 310's activity summary (e.g., a single failed connection attempt to an SQL port) may not be cause for suspicion; however, it may prove suspicious in combination with data from other hosts.

Host 310 may transmit an activity summary to one or more other hosts. In this example, host 310 may transmit an activity summary to each of hosts 300, 320, 340 and 360 in the enterprise network. In response to receiving the activity summary, the host agents installed on each of hosts 300, 320, 340 and 360 may correlate the security data in the activity summary with network traffic and/or other data local to their corresponding hosts to evaluate the potential security threat. For example, host 360 may find little correlation between the events reported by host 310, events local to host 360 and known security threat patterns, because attacker 380 did not make a connection attempt on host 360. However, host agents on hosts 320 and 340 may each correlate the events reported by host 310 with events local to their own hosts to discover that attacker 380 has made similar connection attempts to multiple hosts, which in combination are suspicious. Having detected a correlation above some threshold, each of hosts 320 and 340 may then generate security concern messages indicating with greater certainty the source, type and/or context data related to the intrusion attempt. The security concern messages generated at this level may be in any suitable form. In some embodiments, security concerns may be in the form of security reports that may be shared with other hosts for use in correlating with other data to evaluate potentially suspicious network activity.

In some embodiments, security concerns (representing an intermediate level of certainty about a suspected security threat based on data from two or more hosts) may be shared among the multiple hosts of the enterprise network in a similar fashion to the original activity summaries (representing a low level of certainty based on data from a single host). Each host may further correlate security data received in security concerns from other hosts with local data to increase the level of certainty regarding the potential security threat. Each host may also request relevant raw data from other hosts for use in correlation. If it is suspected that one of the hosts has been compromised (for example, if attacker 380 has gained access to host 310), data from that host may be treated differently than data from other hosts. For example, potentially compromised data from host 310 may be removed from further consideration in determining information about a security threat, or the data may be particularly investigated to determine an initial source of suspicious behavior.

When the certainty about a particular security threat (e.g., based on a weighted combination of security concern data from multiple hosts) is increased to a certain level, one or more of the hosts may indicate that the security threat is detected, for example by generating and transmitting a security assessment message through the enterprise network. A sufficient level of certainty for generating a security assessment may be indicated by any suitable criteria. For example, a sufficient level of certainty may be indicated by a threshold number, percentage or other weighted combination of hosts indicating a security concern about a same suspected intrusion, a suspicious sequence and/or pattern of events across multiple hosts, or other predefined criteria relating to security data from multiple hosts.

A security assessment generated at this level may be in any suitable form. In some embodiments, security assessments may be in the form of security reports including security data related to the detected security threat. The security data in the security assessment may include various information about the detected security threat, such as a source, type, severity (damage potential) and fidelity (confidence in the detection) of the detected threat. In response to the security assessment, IPS measures may be enacted to address the security threat, for example by denying attacker 380 further access to the network.

In other embodiments, processing of security concerns to generate security assessments may be performed by a particular dedicated machine or device, such as trusted server 300. In such embodiments, individual hosts may generate activity summaries and security concerns, and transmit them to trusted server 300 for further processing. For example, in response to receiving the activity summary from host 310 identifying a failed SQL connection attempt from attacker 380, hosts 320 and 340 may correlate the security data from host 310 with their own local data to generate security concerns. Trusted server 300 may receive the original activity summary from host 310 as well as the security concerns from hosts 320 and 340. In response, trusted server 300 may request relevant raw data from any of hosts 310, 320, 340 and 360 regarding the potential security threat. If it is suspected that one of the hosts has been compromised, data from that host may be treated differently than data from other hosts, as described above. For example, potentially compromised data may be removed from further consideration in determining information about a security threat, or the data may be particularly investigated to determine an initial source of suspicious behavior. Trusted server 300 may then perform a deeper correlation of the security data received from all of the hosts to determine if a security threat is in fact detected. If the security threat is detected, trusted server 300 may generate a security assessment indicating the detected security threat, its source, type, severity and fidelity.

Figure 4:
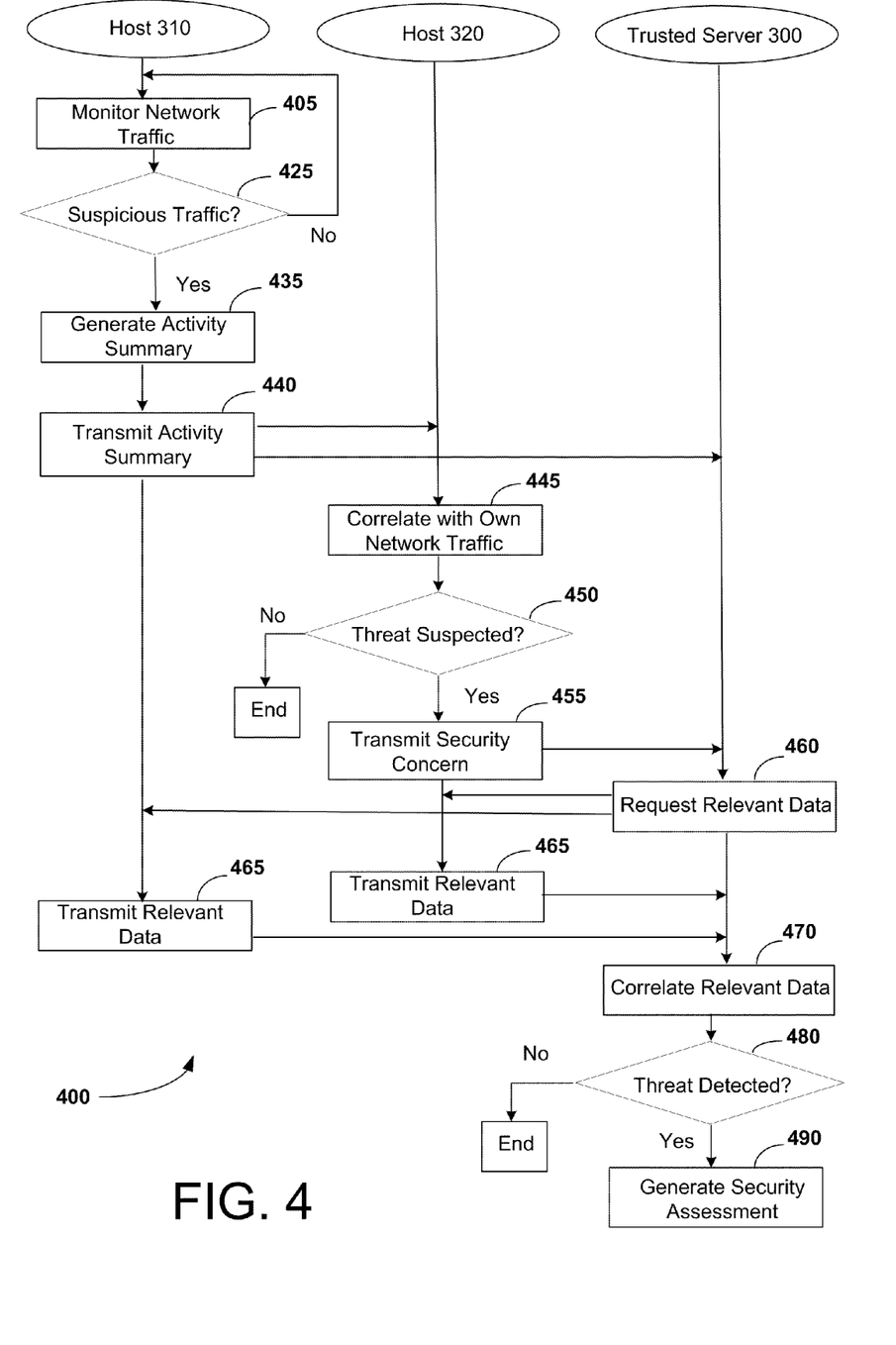
FIG. 4 is a flowchart illustrating a method of operation of a network intrusion detection system with distributed correlation in accordance with some embodiments of the present invention.

FIG. 4 illustrates an exemplary method 400 of performing network intrusion detection with distributed correlation in accordance with some embodiments of the present invention. Method 400 begins at act 405, at which host 310 continuously monitors network traffic local to host 310 (i.e., through actions of a host agent installed on host 310). At act 425, host 310 may determine whether any potentially suspicious traffic patterns are detected within the network traffic monitored at act 405. Potentially suspicious traffic patterns may include traffic patterns known to be indicative of likely security threats, and may also include traffic patterns that could potentially indicate likely security threats when combined at a further act with traffic patterns at other hosts. An exemplary method of detecting potentially suspicious network traffic will be described below with reference to FIG. 5. If it is determined at act 425 that potentially suspicious network traffic exists, host 310 may generate an activity summary, for example in the form of a security report, at act 435. The activity summary may contain information about the potentially suspicious network traffic detected, for example indicating a source and/or type of potentially suspicious traffic, in addition to local context data from host 310. At act 440, host 310 may transmit the activity summary to other hosts in the enterprise network, for example including host 320 and trusted server 300.

In response to receiving the activity summary from host 310, host 320 may correlate security data from the activity summary with its own network traffic data at act 445. At act 450, host 320 may determine whether a level of certainty about the suspected security threat is increased based on the correlation in act 445. If the threat is suspected within increased certainty based on the correlation, host 320 may generate a security concern message, and may transmit the security concern message to trusted server 300 at act 455. The security concern may also be in the form of a security report, including information identifying a source, type and/or local context data related to the suspected security threat.

In response to receiving the original activity summary from host 310 at act 440 and the security concern from host 320 at act 445, trusted server 300 may prepare for further processing by requesting a subset of raw data relevant to the suspected security threat from hosts 310 and 320 at act 460. In response to the request from trusted server 300, hosts 310 and 320 may transmit the requested data to trusted server 300 at act 465. At act 470, trusted server 300 may correlate data received from hosts 310 and 320 at act 465 with security data received in the security concern at act 455 and security data received in the activity summary at act 440. Various data received from various sources may be weighted and/or treated differently in such correlation. For example, security data received in security concerns may be weighted based on a level of certainty associated with each security concern. Security data and/or relevant raw data from different types of hosts may also be weighted and/or treated differently; for example, security data from a server may carry greater weight than security data from other types of hosts. Security data from a suspected compromised host may be particularly investigated or removed from consideration in various embodiments.

Based on results of this deeper correlation, trusted server 300 may make a determination at act 480 as to whether the security threat to the network is in fact detected. If it is determined that the threat is detected, trusted server 300 may indicate this determination through generating a security assessment message at act 490. The security assessment may also be in the form of a security report that may be transmitted throughout the enterprise network, and may include such information as a source, type, severity and fidelity of the detected security threat. In response to the security assessment, IPS measures may be enacted within the enterprise network to protect it from the source of the security threat.

At any level, correlation of raw network traffic data local to a host with known security threat patterns and/or security data received from other hosts may include any suitable form of comparison of the network traffic data and/or security data with known threat patterns, for example stored in a memory of the host. Results of such comparison may indicate a likelihood that a current network traffic pattern, either in isolation or potentially in combination with network traffic patterns at other hosts, is indicative of a network intrusion attempt. Known threat patterns may include patterns characteristic of previous known intrusion attempts to the enterprise network or to other computing systems. As new forms of intrusion attempts are detected, new known threat patterns may be discovered and added to the patterns stored at a host and/or central device, for use in future correlations to detect future intrusion attempts.

Although exemplary embodiments have been described in which a central device (e.g., trusted server 300) may perform processing of security concerns and generating of security assessments, it should be appreciated that in some embodiments such acts may be performed by one or more other hosts (e.g., hosts 310, 320, 340, 360, or any other host installed with a host agent within the enterprise network). In some embodiments, a host may generate its own activity summaries and/or security concerns, and may also process activity summaries and/or security concerns from other hosts. In some embodiments, security concerns may be generated based on processing of data received in other security concerns and/or activity summaries from other hosts.

Figure 5:
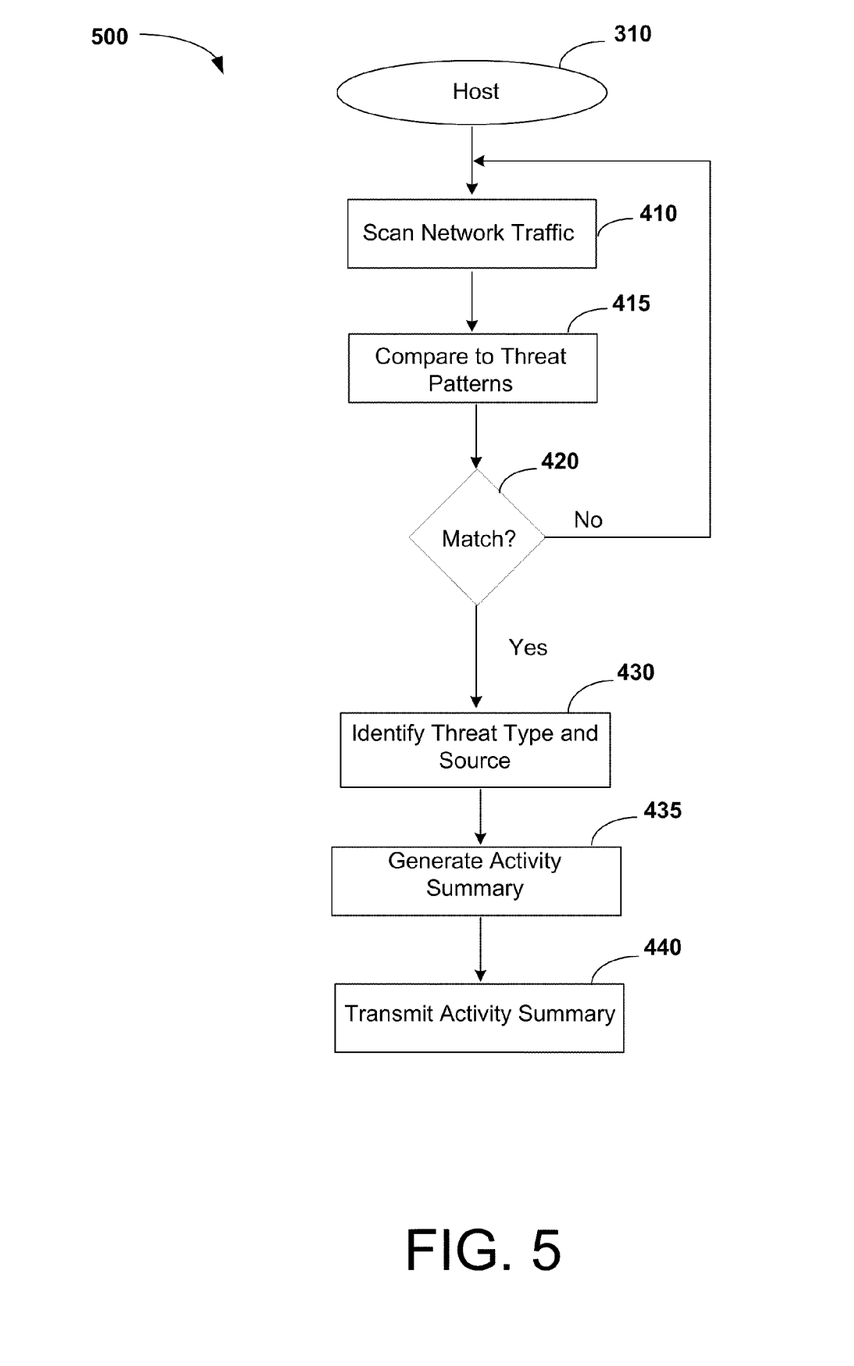
FIG. 5 is a flowchart illustrating a method of generating a security report at a host in accordance with some embodiments of the present invention.

FIG. 5 illustrates an exemplary method 500 of operating a host in which an initial activity summary is generated at a host in accordance with some embodiments of the present disclosure. Method 500 begins at act 410, at which an individual host, for example host 310, continually scans network traffic received at and sent by the host 310. At act 415, host 310 may compare the scanned network traffic with known patterns of security threats. Known security threat patterns may be stored, for example, in a memory of host 310, for use in detecting new security threats to an enterprise network. At act 420, host 310 may determine whether scanned network traffic matches any known threat patterns. A match to a known threat pattern may indicate a likelihood, based on the known threat pattern, that the current network traffic pattern in isolation is indicative of a network intrusion attempt, or that the current network traffic pattern may potentially become indicative of a network intrusion attempt when processed at another level in combination with network traffic data from other hosts. A match to a known threat pattern need not necessarily indicate that the current traffic pattern is identical to a known threat pattern. For example, a match to a known threat pattern may be indicated by any appropriate level of similarity, based on any suitable measure of similarity, between a current traffic pattern and a known threat pattern. Known threat patterns may identify, for example, local network traffic patterns known to be associated with suspicious activity, even when observed in isolation at a single host. Known threat patterns may also identify local network traffic patterns that may not appear suspicious in isolation, but are known to have the potential to become suspicious when combined with certain patterns at other hosts.

If a match to a known threat pattern is detected, host 310 may proceed to identify information relating to the potential threat. For example, at act 430, host 310 may process recent network traffic to identify a type of potentially suspicious traffic detected and a source of the potentially suspicious traffic. At act 435, host 310 may generate an activity summary, for example in the form of a security report, including the information identifying the potential security threat to the enterprise network. The activity summary may indicate a low level of certainty about the potential security threat based on the local data of the individual host 310. At act 440, host 310 may transmit the activity summary generated in act 435 to other hosts within the enterprise network, such that the security data contained in the activity summary can be correlated with data from other hosts. Results of correlation at other hosts may increase the level of certainty with which the potential security threat may be evaluated.

Figure 6:
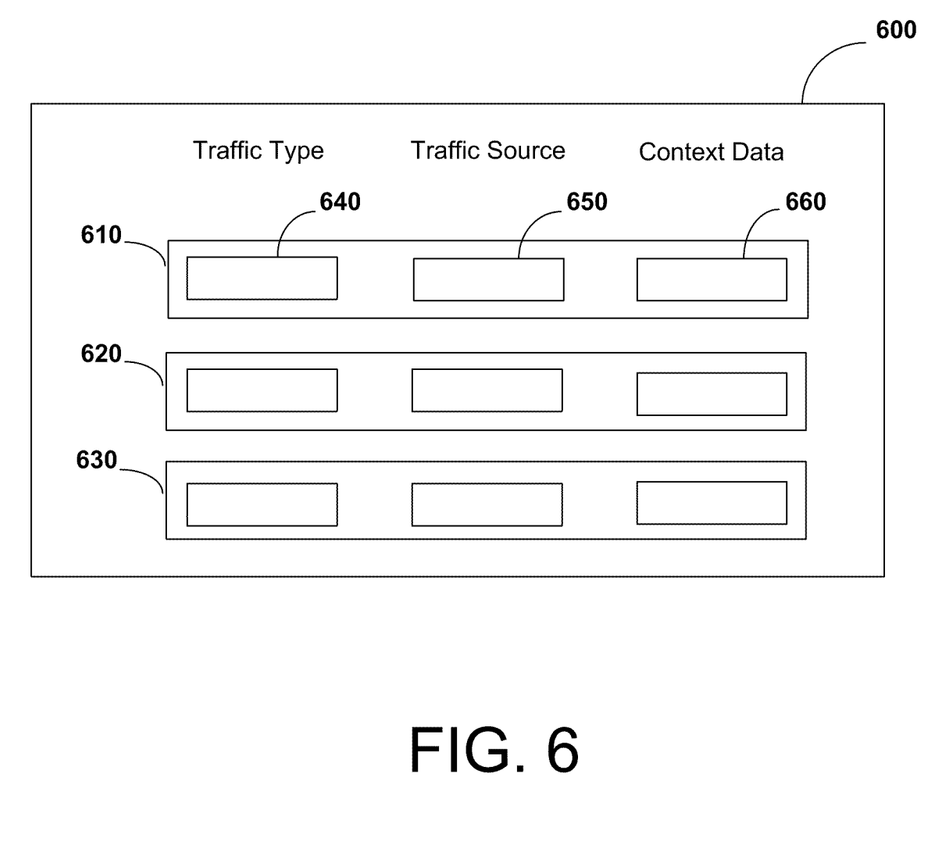
FIG. 6 is a block diagram illustrating an exemplary security report in accordance with some embodiments of the present invention.

Activity summaries, security concerns and security assessments may each be generated and/or transmitted in any suitable form. In some embodiments, activity summaries, security concerns and/or security assessments may be in the form of security reports including security data. FIG. 6 illustrates an exemplary structure of a security report in accordance with some embodiments of the present disclosure. Security report 600 may include security data pertaining to any number of detections of potentially suspicious network interaction events, e.g., events 610, 620 and 630. Each event may represent, for example, a single network connection or interaction, or a grouping of any number of related connections or interactions. For each event, security report 600 may include one or more fields containing summarized information useful for correlating the event to events on other hosts. For example, security report 600 may include fields 640 containing information related to a type of potentially suspicious network traffic. Security report 600 may also include fields 650 containing information related to a source of potentially suspicious network traffic (e.g., a source IP address or other identifying information). In addition, security report 600 may include fields 660 containing local context data related to the network event. For example, context data may include information related to hardware and/or software installed on the host generating security report 600, tasks being executed by the host at the time the potentially suspicious network event occurred, recent potentially suspicious activity occurring previous to the current event, and/or any other potentially relevant local context data from the host.

As discussed above, activity summaries, security concerns and/or security assessments may be generated in the form of security reports. Security reports representing security concerns and/or security assessments may include security data pertaining to one or more event types related to combined processing of security data from other hosts. Security reports may include any number, form and content of data fields and/or elements that may be useful in correlating events and/or observations from multiple hosts for network intrusion detection. Security reports may be transmitted and/or shared among any suitable host machines and/or devices associated with an enterprise network, and may be stored on any suitable host machines and/or devices, for example on one or more computer-readable media.

Figure 7:
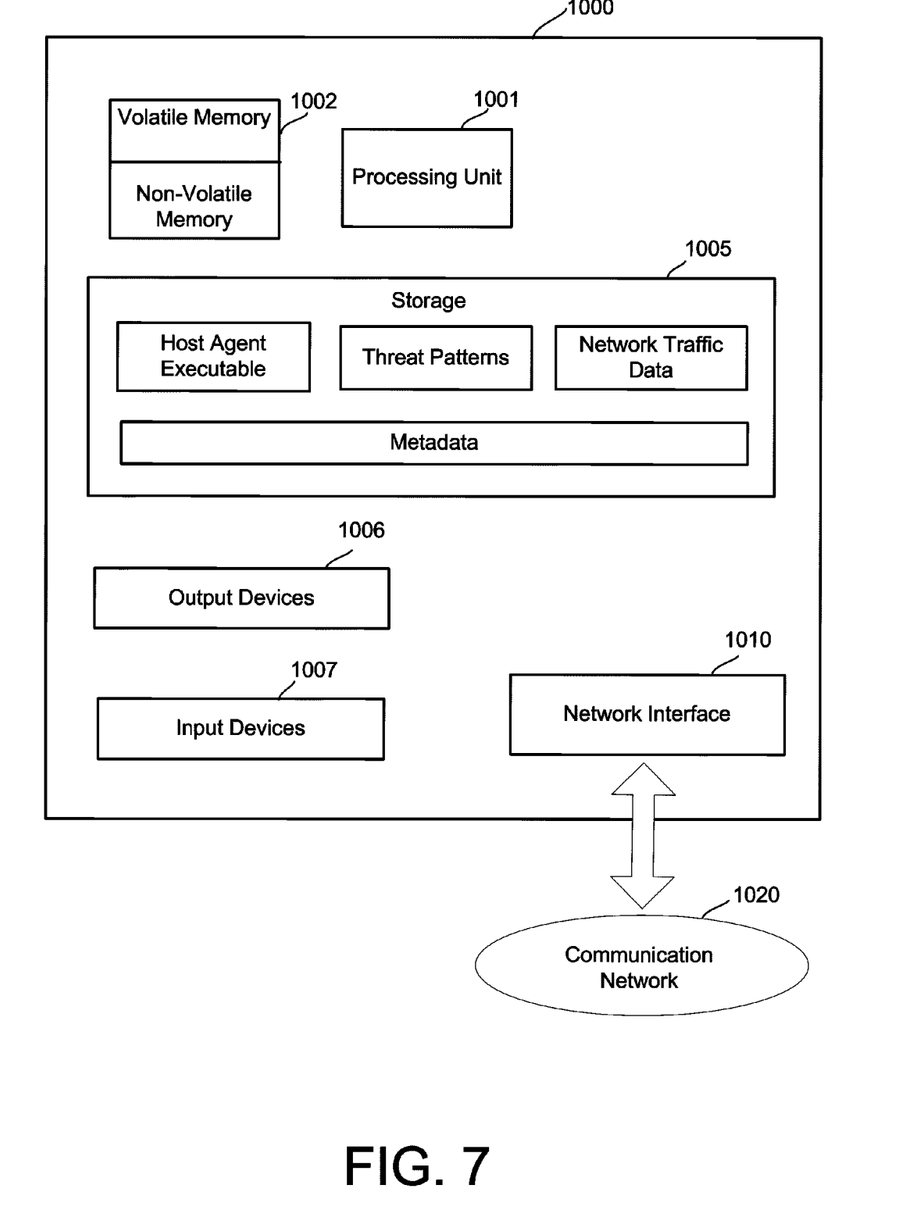
FIG. 7 is a block diagram of a host computing system in accordance with some embodiments of the present invention.

Various inventive aspects described herein can be used with any of one or more computers and/or devices each having one or more processors that may be programmed to take any of the actions described above for detecting network intrusion. For example, any host machine or server in accordance with the present disclosure may be implemented in some embodiments as one or more computers. FIG. 7 shows, schematically, an illustrative computer 1000 on which various inventive aspects of the present disclosure may be implemented. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The storage 1005 may be used to store any data useful in performing any of the functions described herein, such as network traffic data monitored by a host agent, known threat patterns to which the network traffic data may be compared, and metadata pertaining to such information as how/when network traffic data was collected, relations between network traffic data and threat patterns, and/or other data about the network traffic data. One or more executable files for implementing a host agent for network intrusion detection with distributed correlation in accordance with some embodiments of the present disclosure may also be included in storage 1005.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, a tablet computer, or an embedded system. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for detecting an intrusion attempt in a network comprising a plurality of host machines, the method comprising:
    monitoring, at a first host machine, local network activity at the first host machine;
    receiving, at the first host machine, at least one security report from one or more host machines in the network, each security report summarizes network traffic at a respective host machine indicative of a possible intrusion attempt at a respective host machine and/or context data local to a host machine;
    correlating, at the first host machine, the at least one security report with the local network activity;
    associating, at the first host machine, a level of security concern when a correlation exceeds a threshold;
    when the level of security concern indicates a network intrusion attempt, generating a second security report indicating a suspected network intrusion attempt; and
    correlating a plurality of security reports including the second security report to determine whether a network intrusion attempt is detected, the plurality of security reports being generated by multiple host machines.

2. The method of claim 1, wherein the correlating of the plurality of security reports is performed by a processor of a second host machine of the one or more host machines.

3. The method of claim 1, wherein the correlating of the plurality of security reports is performed by a processor of a server separate from the one or more host machines.

4. The method of claim 1, wherein the first host machine is connected to the network by a wireless connection.

5. The method of claim 1, wherein the first host machine is a virtual machine.

6. The method of claim 1, wherein monitoring, at a first host machine, local network activity at the first host machine, further comprises decrypting network traffic data received at the first host machine.

7. The method of claim 1, wherein the at least one security report from one or more host machines in the network comprises data generated by at least one host protection technology operatively connected to a second host machine.

8. A system for detecting a security threat to a network comprising a plurality of host machines, the system comprising:
    a first host machine having a first threat monitoring software agent being configured to:
        monitor network activity from the first host machine to generate a first security report identifying a possible security threat to the network, the first security report summarizes network activity at the first host machine, the network activity including network traffic and/or context data local to a host machine, and
        send the first security report to at least a second host machine;
    a second host machine having a second threat monitoring software agent being configured to:
        monitor network activity at the second host machine,
        receive the first security report from the first threat monitoring software agent,
        correlate at least the first security report from the first threat monitoring software agent and network activity from the second host machine to determine whether the security threat to the network is suspected, and
        when a security threat to the network is suspected, generate a second security report indicating that the security threat to the network is suspected by the second host machine; and
    a server having a threat detecting software agent configured to process a plurality of security reports to determine whether a security threat to the network is detected, the plurality of security reports being obtained from multiple ones of the plurality of host machines, and the plurality of security reports comprising the second security report.

9. The system of claim 8, wherein the correlation matches patterns of known security threats to the network activity.

10. The system of claim 8, wherein the server is separate from the plurality of host machines.

11. The system of claim 8, wherein at least one of the plurality of host machines is connected to the network by a wireless connection.

12. The system of claim 8, wherein at least one of the plurality of host machines is a virtual machine.

13. The system of claim 8, wherein the first threat monitoring software agent is further configured to:
    decrypt network traffic data received at the first host machine; and
    process at least the decrypted network traffic data to generate the first security report.

14. The system of claim 8, wherein the threat detecting software agent is further configured to:
    generate a third security report identifying the detected security threat to the network, when a security threat to the network is detected.

15. The system of claim 14, wherein the third security report identifies at least one of a severity of the detected security threat to the network and a fidelity of the detected security threat to the network.

16. At least one computer-readable storage memory encoded with a plurality of computer-executable instructions that, when executed, perform a method for detecting an intrusion attempt in a network comprising a plurality of host machines, the method comprising:
- monitoring network traffic at a first host machine of the plurality of host machines to identify network traffic at the first host machine indicative of a possible network intrusion attempt;
- generating a first security report containing security data summarizing the identified network traffic at the first host machine indicative of a possible network intrusion attempt;
- receiving first security reports from others of the plurality of host machines;
- correlating at least the identified network traffic with network traffic indicated in first security reports received from others of the plurality of host machines;
- based on a result of the correlating exceeding a threshold, generating a second security report indicating that a network intrusion attempt is suspected;
- receiving second security reports generated by multiple ones of the plurality of host machines; and
- processing the at least second security reports to determine whether a network intrusion attempt is detected.

17. The at least one computer-readable storage memory of claim 16, wherein:
- the security data indicating the identified network traffic comprises an identification of a source and a type of network traffic identified as indicative of a possible network intrusion attempt; and
- the correlating comprises comparing the source and type of identified network traffic on each of a portion of the plurality of host machines.

18. The at least one computer-readable storage memory of claim 16, wherein the method further comprises removing security reports received from a suspected source of the network intrusion attempt before processing at least second security reports generated by multiple ones of the plurality of host machines to determine whether the network intrusion attempt is detected.

19. The at least one computer-readable storage memory of claim 16, wherein the processing the at least second security reports generated by multiple ones of the plurality of host machines comprises:
- correlating the second security reports generated by multiple ones of the plurality of host machines; and
- determining whether a network intrusion attempt is detected based on a weighted combination of host machines generating a second security report indicating that a same network intrusion attempt is suspected.

20. The at least one computer-readable storage memory of claim 16, wherein processing the at least second security reports generated by multiple ones of the plurality of host machines is performed by at least one processor of at least one of a host machine of the plurality of host machines and a server separate from the plurality of host machines.

* * * * *